Figure 1:
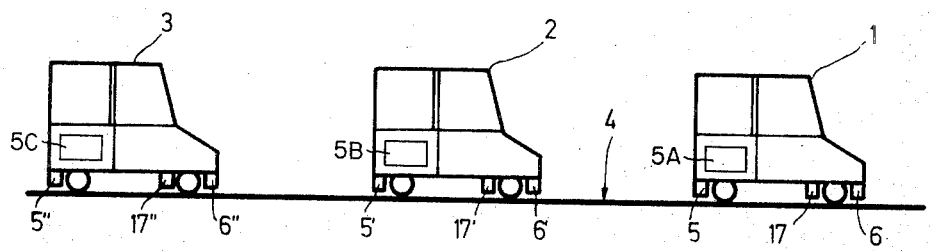

United States Patent [19]

Helmcke et al.

[11] 3,836,770

[45] Sept. 17, 1974

[54] APPARATUS FOR MEASURING THE DISTANCE BETWEEN TWO SUCCESSIVE OBJECTS

[75] Inventors: Conrad Helmcke, Munich; Walter Hermann, Weissenfeld; Peter Kraus, Munich, all of Germany

[73] Assignee: Messerschmitt-Bolkow-Blohm GmbH, Munich, Germany

[22] Filed: Aug. 3, 1972

[21] Appl. No.: 277,783

[30]   Foreign Application Priority Data

Aug. 7, 1971  Germany............................ 2139617

[52] U.S. Cl............ 246/167 D, 246/63, 246/122 R
[51] Int. Cl................................................. B61l 3/22
[58] Field of Search............ 246/167 D, 167 R, 124, 246/63, 122, 30; 340/23, 32, 33; 235/150.24; 38/1; 174/117 F, 115, 133; 325/344; 324/52; 180/98

[56]         References Cited
         UNITED STATES PATENTS

| | | | |
|---|---|---|---|
| 2,509,331 | 5/1950 | Brannen | 246/30 |
| 2,702,342 | 2/1955 | Korman | 246/30 |
| 2,762,913 | 9/1956 | Jepson | 246/124 |
| 2,965,188 | 12/1960 | Hanysz | 246/30 |
| 3,172,627 | 3/1965 | Hughson | 246/167 D |
| 3,179,904 | 4/1965 | Paulsen | 338/1 |
| 3,305,682 | 12/1967 | Bolster et al. | 246/30 |
| 3,377,587 | 4/1968 | Nakahara et al. | 246/167 D |
| 3,544,788 | 12/1970 | Guzik | 246/124 |
| 3,546,593 | 12/1970 | Gittinger | 325/344 |
| 3,694,751 | 9/1972 | Takahoshi et al. | 246/30 |

*Primary Examiner*—Duane A. Reger
*Assistant Examiner*—Galen L. Barefoot
*Attorney, Agent, or Firm*—Woodhams, Blanchard and Flynn

[57]         ABSTRACT

The invention relates to and an apparatus for measuring the distance between two spaced objects and wherein either or both of said objects may be movable with respect to each other and/or with respect to a fixed point. Said objects, such as vehicles arranged along a track, each carry a transmitter for the emanation of signals and a receiver for the reception of signals emanated by an adjacent object. The signals are fed to a conductor extending along said track and able to provide a sufficiently rapid attenuation of said signals whereby same may serve as an accurate indicator of relatively short distances between the objects. For example, such conductor can comprise at least two parallel conductors connected throughout their length by resistive means of relatively high conductivity. Supplemental transmitters may also be applied to said objects to suppress transmitted signals in one direction while permitting such transmission in another direction in order to minimize interference with the signal received from another object, as a vehicle, in the one direction. Thus, in a line of three vehicles, the transmitter on the second vehicle will not interfere with the receiver on the second vehicle but will effectively send signals to the receiver of the third vehicle.

11 Claims, 4 Drawing Figures

APPARATUS FOR MEASURING THE DISTANCE BETWEEN TWO SUCCESSIVE OBJECTS

FIELD OF THE INVENTION

The invention relates to method and apparatus for sensing the distance between at least two objects spaced from each other along a track and particularly to a type thereof wherein a signal emanating from one of said objects is received by suitable means in the other of said objects and the distance is determined by the magnitude of the signal received in said last-named object.

BACKGROUND OF THE INVENTION

For automating small distance and metropolitan railways so-called lineal control systems are increasingly being used which aside from the purposes of safety through a continuous speed control also provide an automatic brake and drive control of the individual vehicles. At certain reference points with respect to the track, the vehicles which are usually equipped with transmitting and receiving devices receive information concerning each respectively permissible highest speed, said information being in the form of a driving order which gives the appropriateness of such speeds for the track ahead. The devices for the driving control are in these systems at those locations where information is available for a maximum area which usually means a central location.

However, in such control systems the centralization of such required driving control is disadvantageous, particularly in view of the relatively high system-caused delay times for the preparation and transmission of appropriate orders. These delay times are negligible in the 90 seconds sequence times thus far utilized but are not negligible in the case of substantially shorter sequence times of a few seconds, as are being considered, for example, for the planned railways with so-called individual transport facilities (cabins or the like). In this case a lineal control of the vehicle is at least questionable if during a sequence time of a few seconds all vehicles which are on the track are to be subjected to a control action. In such case the time which is available for each vehicle is so little that a central location interrogation and speed control for the driving order preparation is no longer possible.

When it is desired to realize sequence times of only a few seconds, this can be done as a practical matter only by controlling for each vehicle — irrespective of externally predetermined speed limitations and the like and independently of selected reference points of the track — both its speed and its distance to a vehicle located in front of it in relation to the speed of said last-named vehicle. A basic condition for such a mode of operation, however, is that each vehicle is constantly informed, rather than only at certain reference points, of its distance to the vehicle in front of it.

The purpose of the invention is first to provide an arrangement for measuring the distance between two successive track-supported objects which are equipped with transmitting and receiving devices, with which arrangement the above-mentioned information is possible and by using only relatively simple means. The arrangement is applicable both in the case of objects of traffic systems and also in the case of objects of conveyor systems, for example for the handling of goods.

To attain the first purpose above-named, the invention contemplates that an electric signal of a defined amplitude emanates from a transmitting device on the forward object and is transmitted by means of a clamped medium in which the amplitude of the signal is reduced in a given manner relative to the distance from the transmitting device to the receiving device of the next following object, which receiving device has a preselected sensitivity.

Such medium is thus any carrier which is suitable for transmitting electric energy between transmitting and receiving devices.

In such an arrangement the amplitude of the signal which is received by the receiving device of the next following object is a measure for the distance between both objects. This signal is therefore suitable for controlling the speed of the next following object and for controlling its distance to the forward object.

The arrangement of the invention suggests that the transmitting and receiving devices of the objects are connected through a stationarily arranged line with defined attenuation values.

The use of a line as means for the signal transfer has the advantage that outside interferences can be almost completely overcome. As a line, it is possible to use waveguides, as tubular waveguides, di-electric conductors and the like, and clamped wire lines with two or more parallel conductors.

A further development of the invention provides a wire line with at least two parallel line conductors wherein it is possible to realize a defined attenuation in a simple manner by an ohmic cross leakage. A suitable means for this is a conducting foil through which the conductors of the line are connected to one another over their entire length.

In case that mechanical stresses on the line need to be avoided, it will be advantageous to couple the transmitting and receiving devices to the line inductively. A capacitative coupling, which is provided advantageously by constructing the line as a dielectric conductor, is also possible. The coupling can also be made galvanically.

In the above-described measuring arrangement, a signal which is coupled from the transmitting device of the forward object into the line will extend symmetrically both in the direction of the following object and also in the opposite direction (forwardly), and thus may influence a signal which is transmitted to the forward object from a transmitting device of a still further object provided forwardly of it. To avoid this, it is possible to arrange between the transmitting and receiving device of each object a second, or compensating, transmitting device. Thus, a signal which is coupled into the line by said second transmitting device will at a suitable amplitude and phase position at least almost cancel the signal which has been coupled in by the first (measuring-) transmitting device of the same object as said signal appears at the location of the compensating transmitting device, without excessively affecting the backward extension of such signal. Such a suppression of a signal in a forward direction can take place in a galvanic coupling in a simple manner by a shorting plug which is arranged between the transmitting and receiving device of each object. In the case of inductive and capacitative coupling of the transmitting and receiving devices to the line, in place of or additionally to the compensating transmitting device, common attenuation members can also be used.

Moreover a mistake in the measuring of the distance between two objects by a signal of one or more transmitting devices of objects provided in front of them can be prevented by controlling the measuring-) transmitting device of each object in relation to the signal received by the receiving device of the same object. Thus, the (measuring-) transmitting device of the object will transmit only one signal reduced in accordance with the value of the reclined signal, whereby advantageously the amplitude and phase position of that signal is important at the location of the (measuring-) transmitting device and is not important at the location of the receiving device associated with it.

Figure 2:
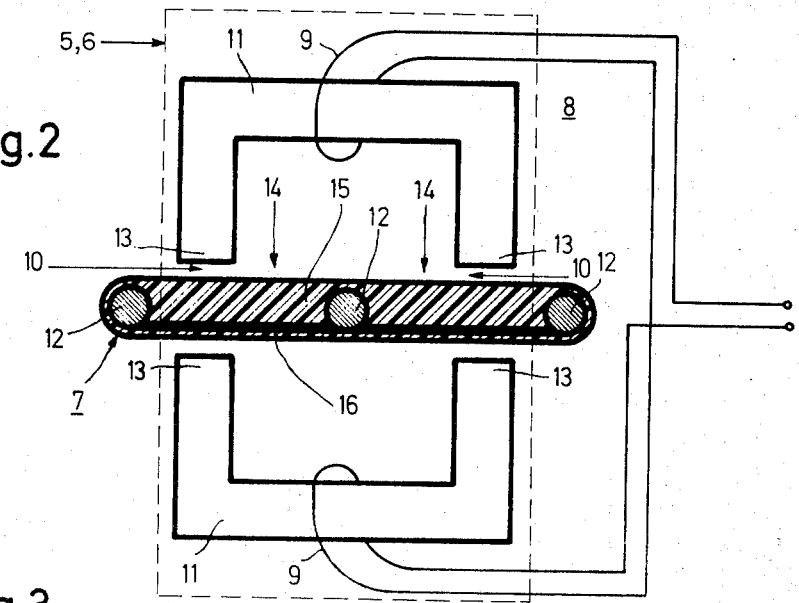
Figure 3:
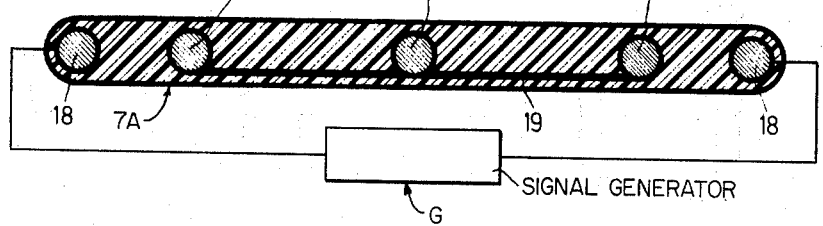
Figure 4:
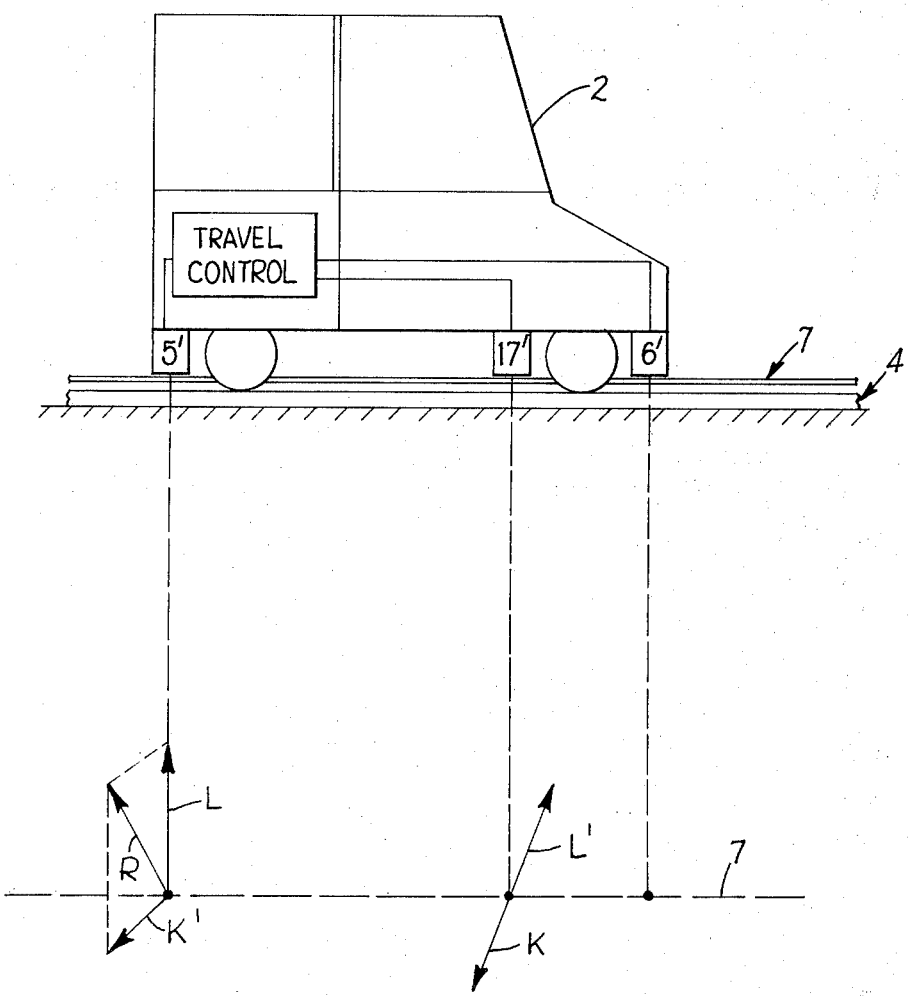

The invention and the further developments of same are discussed more in detail hereinafter in connection with one exemplary embodiment, as illustrated in the drawing, in which:

FIG. 1 is a side schematic view of three track-mounted vehicles which are arranged successively on a track, FIG. 2 is a schematic cross-sectional view of a line consisting of three parallel conductors in association with a coil having two U-shaped iron cores, FIG. 3 is a schematic cross-sectional view of a line with five parallel conductors, FIG. 4 illustrates two signals in a vector diagram, not shown to scale in association with a vehicle.

The vehicles 1, 2 and 3 which are illustrated in FIG. 1 may, for example, be so-called personnel transport facilities of a short distance travel system, which are intended to travel without stopping automatically from a place of departure to a place of arrival. Such vehicles do not pass one another and hence a single track guide for the vehicles 1, 2 and 3 in connection with a rail or the like will be sufficient.

Aside from externally predetermined speed limits, the vehicles 1, 2 and 3, and further not illustrated ones, are intended to regulate themselves, their speed and their distance from each vehicle directly in front of each respectively, in relation to the speed of such last-named vehicle and independently of reference points on the track 4. Such a mode of operation is only possible if each vehicle 1, 2 and 3, and its travel control 5A, 5B and 5C, respectively, is continuously informed as to the distance from a given vehicle to the vehicle immediately ahead. For this purpose the vehicles 1, 2 and 3 are equipped with transmitting and receiving device 5, 5', 5'' and 6, 6', 6'' which are inductively coupled with a line 7 which is stationarily arranged along the track 4 of the vehicles (FIG. 2). In the arrangement of the transmitting and receiving device 5, 5', 5'' and 6, 6', 6'' (below the vehicles) as chosen in FIG. 1, the line is on the track 4 and is therefore not here visible.

The transmitting devices 5, 5' and 5'' may comprise generators for producing a high-frequency alternating current, for example transistor generators, which are each connected to one coil. The receiving devices 6, 6' and 6'' can each consist of an amplifier (transistor-amplifier) and a coil connected thereto. The coils of the transmitting and receiving devices 5, 5', 5'' and 6, 6', 6'' respectively, are of the same construction excepting for the number of their windings. Thus, in FIG. 2 only one coil 8 is schematically illustrated in connection with the line 7, its winding 9 being symmetrically distributed between two U-shaped iron cores 11 of the same dimensions. Said cores define air gaps 10 and are arranged symmetrically with respect to the line 7 which extends longitudinally through the air gaps 10.

In the preferred construction of the coil 8, the magnetic leakage will be small compared with the useful flux in the iron cores 11 and across the air gaps 10. Further the magnetic flux is evenly distributed in the air gaps 10. In this manner, a maximum efficiency is obtained for the transmitting devices 5, 5' and 5'', and the sensitivity of the receiving devices 6, 6' and 6'' to a magnetic interference field is held to a minimum.

As can be further seen from FIG. 2, the line 7 consists of three parallel conductors 12 arranged in one plane, of which conductors the two outer ones are spaced the same distance from the central conductor. This symmetric line 7 has a substantially higher security against interference compared with the usual double line. Since the vehicles 1, 2 and 3 and accordingly their transmitting and receiving devices 5, 5', 5'' and 6, 6', 6'' or rather their coils (coil 8), may move laterally during their travel with respect to the line 7, the width of the respective pole shoes 13 of the iron cores 11 is less than the distance between the outer and the central conductor 12 of the line 7 and the width of such line is selected to be greater than that of the iron cores 11. In this construction both conductor loops 14 are uniformly permeated by the magnetic flux and continue so even during lateral shifting of the coil 8 relative to the line 7. It is understood that a dragging of the line 7 on the pole shoes 13, such as due to an upward movement of the vehicles 1, 2 and 3, is prevented through suitably wide air gaps 10. In the above-described construction of the coil (windings 9 distributed symmetrically on two iron cores 11) such movements have no effect on the coupling to the line.

Finally a support member 15 of a non-conductive material is provided for the conductors 12, which support member has a not illustrated slight transverse ripple in order to make it possible to lay the line along curves of the track 5 without difficulty.

The conductors 12 are together with a conducting foil 16, for example a carbon coated plastic foil, embedded in the support 15, wherein they are connected conductively to each other over their entire length by the foil 6. This results in a strong ohmic cross leakage of the line 7 which in connection with the series impedance of the line 7 results in a strong attenuation of a signal along same. In the series impedance of the line 7, the series inductivity thereof is also included, or, in the case of a line with conductors of resistance material, its ohmic series resistance together with, if appropriate, with the series inductivity.

In such a clamped line 7, the amplitude of a signal which is coupled in by a transmitting device 5, 5' or 5'' decreases measurably through only a short section of line (for example a section of one meter line length), and does so according to an exponential law with negative exponent. The amplitude of the signal at any desired point is thus a function of the distance between such point and the respective transmitting device. The structure of this line is further described in our co-pending application Ser. No. 277,781, filed on even date herewith and assigned to the same assignee as the present application.

Accordingly, in this example, the last one of the vehicles 1, 2 and 3 illustrated in FIG. 1 is being continually informed by means of its receiving device 6'' as to the distance from it to the next vehicle 2 ahead of it as long as the latter's transmitting device 5' injects a signal of defined amplitude (high-frequency alternating current) into the clamped line 7 (FIG. 2).

The conduction of the signal of a transmitting device 5, 5', or 5'' is accomplished symmetrically in both directions in the line 7, thus in either direction of travel of the vehicles 1, 2 and 3. The signal of the transmitting device 5' of the central vehicle 2 can thus influence the signal received by its receiving device 6' and which emanated from the transmitting device 5 of the vehicle 1 positioned in front thereof. This can lead to an improper indication of the distance between these two vehicles 1 and 2. In order to eliminate such influence by the signal from the transmitting device of the following one of such two vehicles, a compensating transmitting device 17, 17' or 17'' is arranged between the transmitting devices 5, 5', 5'' and the receiving devices 6, 6', 6'' of each object 1, 2 and 3, the structure of which compensating transmitting device corresponds substantially to the (measuring-) transmitting devices 5, 5' and 5''.

The operation of the compensating transmitting devices 17, 17' and 17'' will be discussed more in detail hereinafter in connection with the device (17') applied to the central vehicle 2. The measuring transmitting device 5 emits for example the signal L which during its travel into the line 7 is attenuated and phase shifted and arrives as signal L' at the location of the compensating transmitting device 17. Same produces a signal K which cancels the signal L'. Thus at the location of the receiving device 6 there is no signal from the measuring transmitting device 5 or from the compensating transmitting device 17 of the same vehicle. The signal K of the compensating transmitting device is also attenuated during a travel rearwardly and is phase shifted and appears as signal K' at the location of the measuring transmitting device 5. The sum vector of the signals K' and L is the resultant signal R which is effectively transmitted rearwardly by the vehicle. One will immediately recognize that because of the attenuation and phase shifting characteristics of the line 7, the resultant signal R is practically just as large as if the measuring transmitting device 5 would transmit alone. In the aforedescribed line 7 one can normally expect a phase shifting of the signal L of approximately 20° (see FIG. 4) on the line section from the (measuring-) transmitting device 5' to the compensating transmitting device 17'. Thus, the signal K of the compensating-transmitting devive 17' will virtually cancel the signal L' at the location of device 17' without substantially influencing its conduction in the direction of the last vehicle 3. This latter is symbolically illustrated in FIG. 4, wherein the signal K' corresponds to the signal of the compensating transmitting device 17' as said signal appears at the location of the (measuring-) transmitting device 5'. The signal R is herein the signal which travels in the line 7 in the direction of the vehicle 3, the amplitude of which signal is only a little reduced compared to the amplitude of the signal L coupled into the line by the (measuring-) transmitting device 5'.

In case a receiving device receives a signal from the transmitting device of a following vehicle, all (measuring-) transmitting devices 5, 5' and 5'' are synchronized. The synchronization can take place by means of a signal which is fed to the vehicles 1, 2 and 3 through a line 7A (FIG. 3) described below and which has conductors 18 separate from the conductors 12, or rather their (measuring-) transmitting devices 5, 5' or 5'', independent of the distance measurement or it may take place by the signal received by the receiving devices 6, 6' or 6'' of each respective vehicle 1, 2 or 3. The small disturbance to the distance measurement between this vehicle and the one in front of it, which interference may be caused by the appearance of a signal above that of a compensating transmitting device of a vehicle, is then as a practical matter of no importance. The synchronization of the (measuring-) transmitting devices is also of importance in the following connection.

In order to avoid a distortion of the distance measurement between two vehicles 1, 2 or 2, 3 through one or more signals of the (measuring-) transmitting devices of vehicles provided in front thereof, the (measuring-) transmitting devices 5, 5' and 5'' of each vehicle 1, 2 or 3 is further controllable by travel control 5A, 5B and 5C in response to the signal received by the receiving devices 6, 6' or 6'' of the same vehicle. In the case of such a response of the (measuring-) transmitting devices 5, 5' and 5'' to the respective receiving devices 6, 6' or 6'', the (measuring-) transmitting device 5' of the central vehicle 2, for example, will only send out a signal which is smaller than that which would be sent out without the presence of the vehicle 1 by the value of the signal of the (measuring-) transmitting device 5 of the first vehicle 1 at the location of transmitting device 5'.

It is understood that for this purpose a calculation is made of the amplitude and phase position of the signal received by the receiving device 6' of the vehicle 2 at the location of the (measuring-) transmitting device 5'; this can be accomplished through a simulation of the line section between receiving device 6' and transmitting device 5'.

A further advantageous advantage of the controllability of the (measuring-) transmitting devices 5, 5' and 5'' can be seen in that the distance between the vehicles 1, 2 and 3 can be manipulated through wide zones and the vehicle columns can be stabilized. For example for the purpose of an optimum use of the track 4 at a minimum risk for the vehicles 1, 2 and 3 the distance between the vehicles 1 and 2 (of which the vehicle 1 as the front one is the most endangered one at suddenly encountered obstacles) may be maintained greater than the space between the following vehicles.

It may be noted that it is not always necessary to provide the described suppression of the signal in the direction of travel of the vehicles 1, 2 and 3 and the controllability of the (measuring-) transmitting devices 5, 5' and 5'' (for example, in case of simple conveyor systems from which less is demanded). In this case, however, with a greater number of vehicles (for example 10,000), each vehicle would have to utilize an independent, closely stabilized, frequency which is sufficiently different from all other frequencies to be distinguishable. Since this is not technically desirable, one will wobble all frequencies of the transmitting devices. For this purpose, a purely statistic frequency wobbling is used since due to the then quadratic addition of the signals a rapid reduction of the influence of interference signals is obtained if their amplitude decreases relatively to the measuring signal.

If the vehicles 1, 2 and 3 are to receive further information concerning certain reference points on the track 4 (for example, giving of maximum speeds), in the described measuring arrangement the clamped line 7 needs only to be expanded through one or more conductor pairs. Such a line 7A is shown in FIG. 3. It differs from the line 7 shown in FIG. 2 in that the three conductors 20 which are connected by a conducting foil 19 are arranged at small spacings from one another between an outer pair of conductors 18, but no conducting connection exists between either of the conductors 18 and any of the conductors 20. This conductor pair 18 is coupled to a signal generator G the internal impedance of which is substantially greater than the characteristic impedance of the clamped conducting part (conductor 20 with foil 19). In this manner a signal which is coupled into the conductor pair 18 and a signal which exists in the clamped line part cannot influence one another.

The embodiments of the invention in which an exclusive property or privilege is claimed are defined as follows:

1. In an apparatus for continuously measuring the distance between two successive track carried objects each having at least a signal transmitter and a signal receiver thereon, a signal transmitted by said signal transmitter in one object being received by said signal receiver in the next object on said track, the improvement comprising:

stationary signal transmission line means extending coextensively with said track, said signal transmission line means comprising at least two laterally spaced and parallel electrical signal transmitting conductors and electrical connection means for electrically connecting said conductors continuously along the length of said conductors, the cross leakage of an electrical signal between said conductors through said electrical connection means effecting a higher than normal continuous attenuation of said electrical signal in a longitudinal direction along said conductors so that the amplitude of said electrical signal transmitted over said conductors will be continuously diminished in said longitudinal direction, said signal transmitter and said signal receiver being coupled to said signal transmission line means, said signal transmitter on said one object being adapted to transmit a signal along said signal transmission line means toward the next located object on said track, said signal receiving means in said next object being adapted to receive said signal from said signal transmission line means; and travel control means in said next object being responsive to the received signal in said signal receiver, the amplitude of the received and attenuated signal being a measure of the distance between said one and next objects.

2. The improvement according to claim 1, including a compensating transmitting device mounted on each of said objects and adapted to transmit a counter signal into said signal transmission line means opposite in phase and polarity of the signal generated by said signal transmitter to effect an isolation of said signal receiving means from said signal transmitter.

3. The improvement according to claim 2, wherein said objects are personnel carrying vehicles.

4. The improvement according to claim 1, wherein said signal transmission line means includes an additional laterally spaced and parallel electrical signal transmitting conductor coplanar with the plane defined by said two conductors and wherein the centrally positioned conductor is equidistant from each of the remaining two conductors.

5. The improvement according to claim 1, wherein said electrical connection means comprises a continuous foil electrically connected to said conductors.

6. The improvement according to claim 3, wherein said signal transmitter and said signal receiver is inductively coupled to said signal transmission line means.

7. The improvement according to claim 6, wherein said inductive coupling is accomplished by means defining a pair of U-shaped iron cores located on opposite sides of said signal transmission line means and being spaced from said signal transmission line means to define air gaps therebetween and having windings thereon.

8. The improvement according to claim 7, wherein the width of said signal transmission line means is greater than the width of said iron cores.

9. The improvement according to claim 8, wherein said iron cores include means defining pole shoes, the width of said pole shoes being less than the distance between said conductors.

10. The improvement according to claim 1, wherein said signal transmission line means includes an additional laterally spaced and parallel electrical signal transmitting conductor coplanar with the plane defined by said two conductors and wherein the centrally positioned conductor is equidistant from each of the remaining two conductors; and including an additional pair of conductors coplanar with said plane, said three conductors being located between said additional pair of conductors.

11. The improvement according to claim 10, including means defining a signal generator connected to said additional pair of conductors, the internal impedance characteristic of which is substantially greater than the impedance characteristic of said signal transmission line means.

* * * * *